United States Patent
Polter (10) Patent No.: US 11,709,043 B1
(45) Date of Patent: Jul. 25, 2023

(54) RESILIENT MOUNT GAGE TOOLS

(71) Applicant: The United States of America, as represented by the Secretary of the Navy, Arlington, VA (US)

(72) Inventor: Sherwood Polter, Blue Bell, PA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 59 days.

(21) Appl. No.: 17/646,382

(22) Filed: Dec. 29, 2021

(51) Int. Cl.
*G01B 3/00* (2006.01)
*G01B 5/24* (2006.01)
*G01B 5/00* (2006.01)
*G01B 5/14* (2006.01)
*G01B 5/25* (2006.01)
*B33Y 80/00* (2015.01)

(52) U.S. Cl.
CPC ............ *G01B 3/002* (2013.01); *G01B 5/003* (2013.01); *G01B 5/0025* (2013.01); *G01B 5/14* (2013.01); *G01B 5/24* (2013.01); *G01B 5/25* (2013.01); *B33Y 80/00* (2014.12)

(58) Field of Classification Search
CPC ...... G01B 3/002; G01B 5/0025; G01B 5/003; G01B 5/14; G01B 5/24; G01B 5/25; B33Y 80/00
See application file for complete search history.

(56) References Cited

U.S. PATENT DOCUMENTS

| | | | | |
|---|---|---|---|---|
| 2,117,854 | A * | 5/1938 | Price | G01B 5/166 33/606 |
| 4,285,132 | A * | 8/1981 | Kloster | G01B 5/003 33/550 |
| 4,553,335 | A * | 11/1985 | Woyton | G01B 5/25 33/DIG. 1 |
| 4,744,153 | A * | 5/1988 | Brand | F16C 25/06 33/606 |
| 4,787,150 | A * | 11/1988 | Klinginsmith, III | G01M 17/022 33/645 |
| RE33,302 | E * | 8/1990 | Mason | G01B 5/0025 33/608 |
| 4,953,307 | A * | 9/1990 | Loucas | G01B 5/14 33/809 |
| 5,199,181 | A * | 4/1993 | Gordin | H01R 43/14 33/645 |
| 7,073,267 | B2 * | 7/2006 | Butler | G01B 3/20 33/203.18 |
| 7,356,938 | B2 * | 4/2008 | Brueckert | B61G 7/00 33/645 |
| 7,690,128 | B1 * | 4/2010 | Thompson | G01B 5/255 33/645 |
| 7,861,433 | B2 * | 1/2011 | Saeler | G01B 3/14 33/651 |
| 8,978,260 | B2 * | 3/2015 | Brueckert | B23P 6/00 33/651 |

* cited by examiner

*Primary Examiner* — John Fitzgerald
*Assistant Examiner* — Tania Courson
(74) *Attorney, Agent, or Firm* — Naval Surface Warfare Center, Philadelphia Division; Mark J. Rosen (57) ABSTRACT

A gage tool having a stem and two concave curved ports adapted to fit snugly to the curved convex corners of a resilient mount facilitates easy and precise measuring of the resilient mount's alignment and snubber gap height.

14 Claims, 6 Drawing Sheets

RESILIENT MOUNT GAGE TOOLS

STATEMENT OF GOVERNMENT INTEREST

The invention described herein may be manufactured and used by or for the Government of the U.S. of America for governmental purposes without payment of any royalties thereon or therefor.

FIELD OF THE INVENTION

The invention is related to the field of measurement tools for insuring proper installation and maintenance of resilient mounts.

BACKGROUND OF THE INVENTION

Resilient mounts range in size and capacity but perform the essential function of absorbing vibration, noise, and displacement to protect the components at either side of the mount. Commonly a resilient mount is used to support an engine, motor, or generator on a chassis (such as a vehicle or ship) or other foundation or frame. The resilient joint insulates the chassis from vibration of the motor while at the same time insulating the motor from displacements caused by the motion of the chassis. Such resilient mounts generally have structural attachment members for mounting to a motor on one side and a chassis on the other, and bear a flexible material between the structural attachment members. The flexible material may be composed of rubber, rubber-like compounds, or other composite materials capable of absorbing vibration, and capable of compressing and/or expanding to absorb displacements between the mounted components. For illustrative resilient mounts, see for example the G Series and M Series mounts from companies such as Greene Rubber Company.

Resilient mounts generally have limiters to prevent displacement from exceeding a maximum displacement permitted by the requirements of the chassis and mounted motor. Such limiters may operate both radially, preventing excessive deflection off the axis of the mount, and vertically, preventing excessive displacement of the motor and chassis from and toward each other. Such limiter, or snubber, provides snubbing action, limiting the minimum allowed proximity of the motor and chassis, and thus the maximum permitted compression of the flexible material. When the mount experiences compression displacement and the motor and chassis move closer to each other, at the minimum of proximity the snubber prevents further compression and the motor and chassis can approach no closer to each other. The maximum displacement of the resilient mount is provided by the snubber gap, the gap between the snubber and the foundation on which the resilient mount is mounted.

Snubber gaps are therefore an essential measurement on resilient mounts because they correspond to the maximum amount of compressive displacement allowed by the mount. Without a snubber gap the mount is effectively no longer resilient. Additionally, uneven loads on the resilient mount may sometimes cause the resilient mount to vary in its radial and axial alignment, causing the snubbers to be compressed to different degrees throughout the mount, leading to inconsistent and unreliable operation, and in some cases ultimately premature failure of the resilient mount.

Depending on the application and the position of the resilient mount within a larger structure, it may be difficult to measure the snubber gaps in multiple dimensions of a resilient mount to ensure proper operation. In order to maintain the resilient mounts in proper operation, it is necessary to inspect the resilient mounts periodically to measure the snubber gaps and alignment. Typically inspectors have used a ruler with indicator slide in combination with friction calipers to measure the snubber gaps in both X and Y axes to determine whether the resilient mounts are within specification. It is frequently difficult, however, to obtain an accurate measurement because one must steady both hands to read the ruler and position the indicator slide for the correct distance measurements. The level of difficulty is even more challenging in cases involving tight spaces on ships and submarines. Indeed it is physically stressful on sailors' bodies to reach such mounts in cramped vessel locations and conduct the arduous time-consuming inspections of hundreds of resilient mounts.

The art is in need of improved measurement tools for measuring the alignment and depth of snubber gaps in resilient mounts with advantages over, and without the disadvantages of, conventional tools.

SUMMARY OF THE INVENTION

Having observed the aforementioned problems with conventional snubber gap inspection tools, the inventor hereof provides an improved measurement tool in the form of a resilient mount gage tool, as well as a set of such gage tools allowing for more convenient, rapid, and accurate inspection of a variety of resilient mounts.

The tool features a stem which also acts as a handle for holding and manipulating the tool, with two curved and flanged sections designed for measuring two different curved portions of a resilient mount's foundation, generally known as the X- and Y-axes, independently.

In one aspect, the invention is directed to a gage tool for measuring alignment and snubber gap height of a resilient mount where the mount has a foundation with a pair of convex curved obtuse X-axis corners and a pair of convex curved acute Y-axis corners, two snubbers, and two load washers. The gage tool has a stem with a top and a bottom, a concave X-axis port situated at the bottom of the stem with an X-axis flange coextensive with the X-axis port's upper surface, and the X-axis port snugly fits the X-axis corners of the foundation. The gage tool also has a concave Y-axis port situated at the bottom of the stem, which has a Y-axis flange coextensive with the Y-axis port's upper surface, and the Y-axis port snugly fits the Y-axis corners of the foundation. The gage tool further has a go/no-go line for measuring the sufficiency of the snubber gap height; and a ruler slot extending through the stem for accepting a ruler. In use, upon positioning the gage tool on a plurality of the curved convex corners of the resilient mount, a plurality of measurements of the distance from the stem to the load washer are taken to determine whether the resilient mount is aligned within an alignment specification, and the snubber gap height is measured with respect to the go/no-go line to determine whether the snubber gap height is within a snubber gap specification.

In another aspect, the gage tool may have markings identifying a type and a model of the resilient mount for which the gage tool is designed to fit, and may have markings identifying the X-axis and the Y-axis. The gage tool typically has a cross section selected from square, rectangular, circular, and elliptical profiles. In some aspects, the gage tool is constructed from materials such as metals, metal alloys, carbon fiber, resins, composites, acrylics, plastics, thermoplastics, thermoplastic polymers, and biopolymers. In one aspect, the gage tool is constructed by additive manufacturing. In another aspect, the gage tool may have a lanyard hole for convenient carrying by a user. In another aspect, the gage tool may have optional magnets in optional recesses crafted in the ports to assist in firmly securing the gage tool to the resilient mount being inspected. In some aspects, a set of gage tools may be constructed to allow a user to inspect a multiplicity of resilient mounts. Such a tool set may even be carried on a single lanyard passed through the lanyard holes of each gage tool.

In another aspect, the invention provides a method of measuring alignment and snubber gap height of a resilient mount as described above. The method uses the steps of first placing the gage tool of the invention snugly against one convex corner of the foundation with the flange resting on the foundations surface, measuring with a ruler inserted through the slot the distance between the stem and the load washer, and then repeating at additional convex corners. Those measurements are then used to determine whether the alignment of the resilient mount is within alignment specification. During the measurement steps, the snubber gap height is also inspected with respect to the go/no-go line, allowing the user to determine whether the snubber gap height is within snubber gap height specification.

These and other aspects of the invention will be readily appreciated by those of skill in the art from the description of the invention herein.

BRIEF DESCRIPTION OF THE DRAWINGS

FIG. 2 depicts an embodiment of the invention, a resilient mount gage tool designed for measuring the alignment and snubber gap in a resilient mount.

FIG. 3 depicts an embodiment of the invention, a resilient mount gage tool designed for measuring the alignment and snubber gap in a resilient mount.

DETAILED DESCRIPTION OF THE INVENTION

Figure 1:
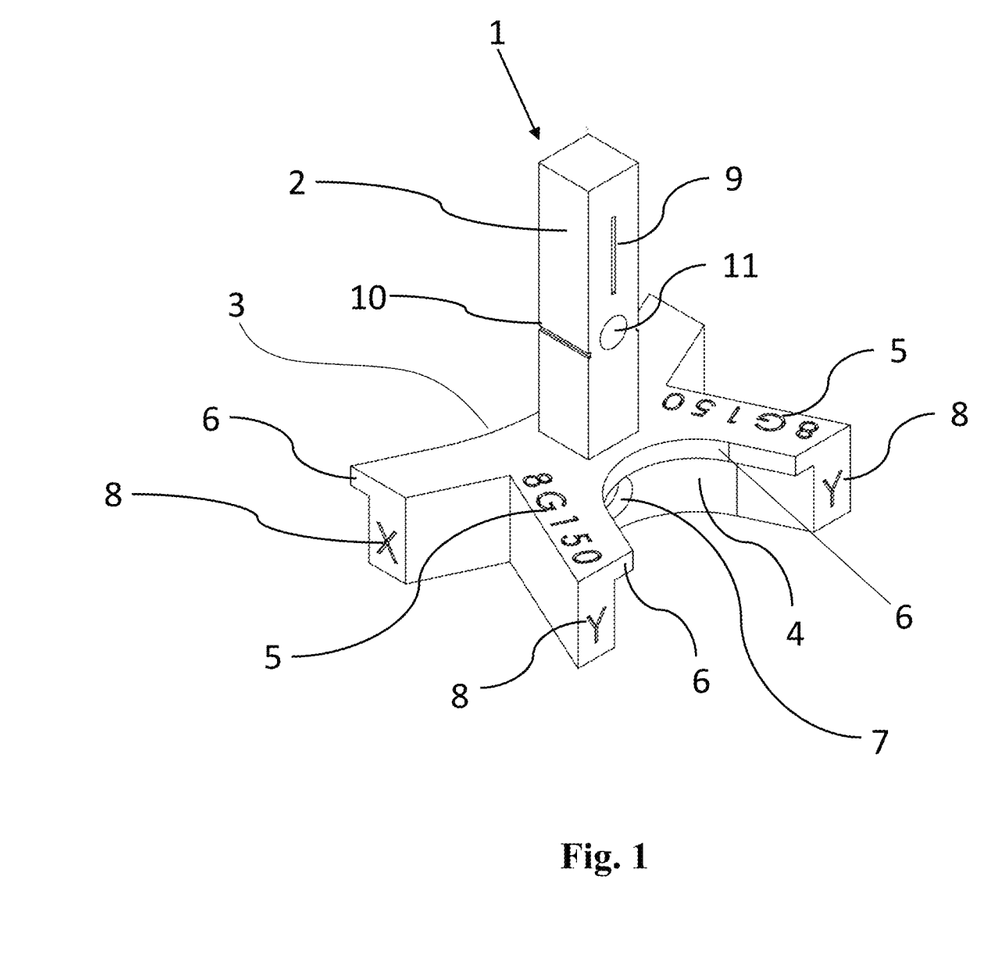
FIG. 1 depicts an embodiment of the invention, a resilient mount gage tool designed for measuring the alignment and snubber gap in a resilient mount.
Figure 2A:
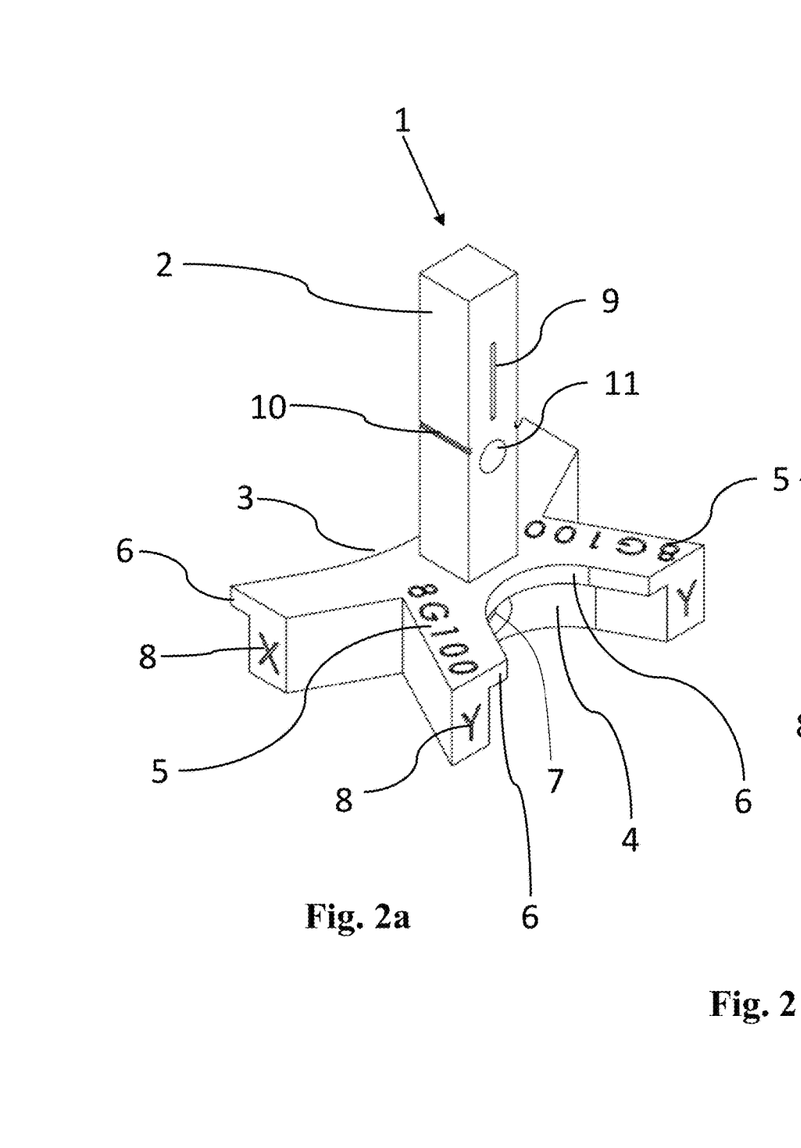
FIG. 2a and FIG. 2b show two views of an embodiment designed to fit a particular resilient mount.
Figure 2B:
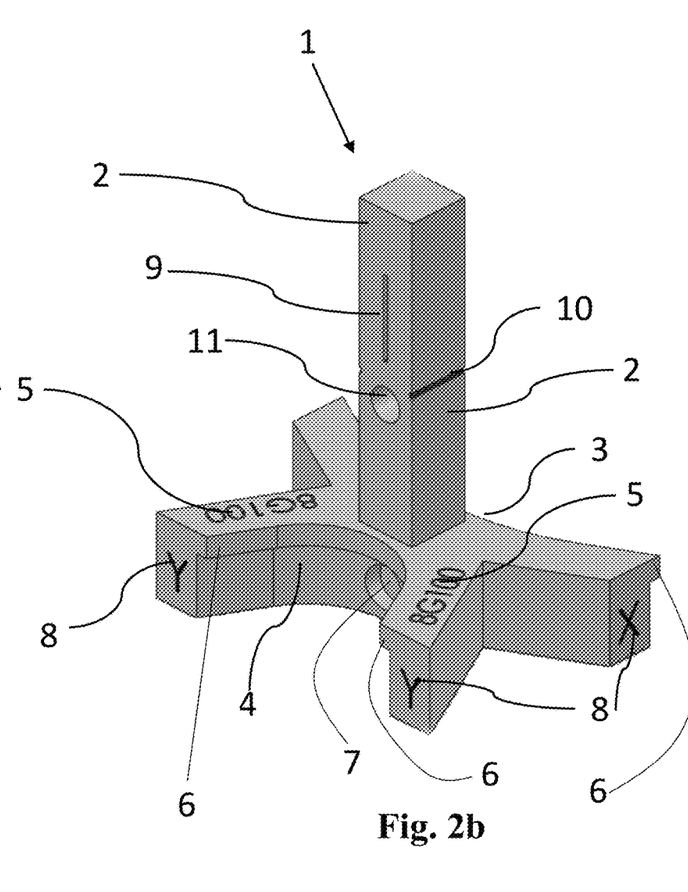
Figure 3A:
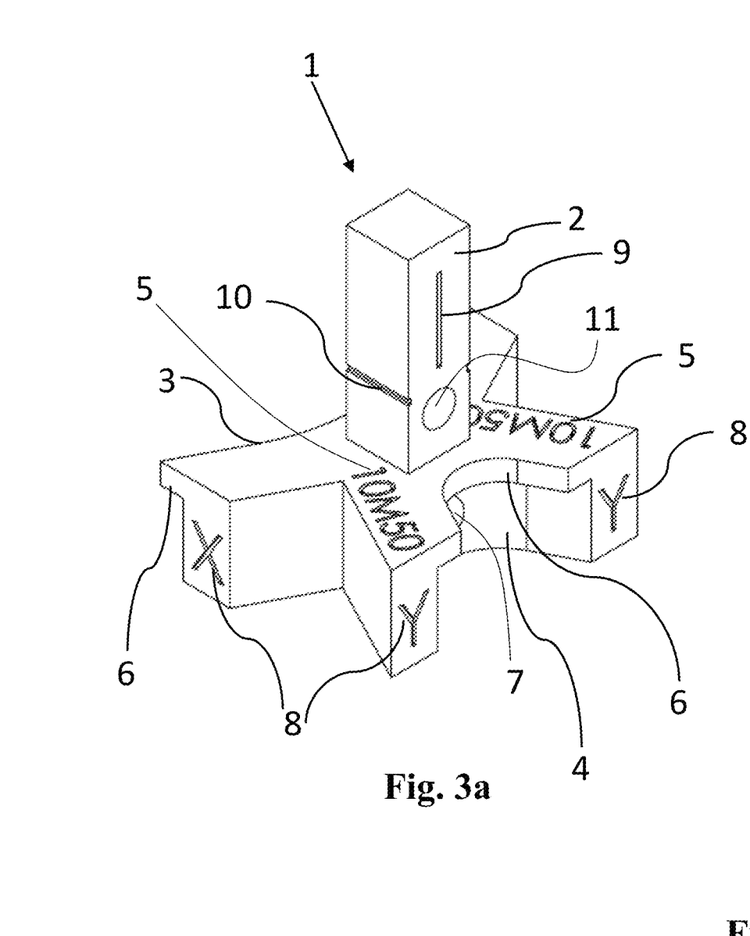
FIG. 3a and FIG. 3b show two different embodiments designed to fit two different resilient mounts.
Figure 3B:
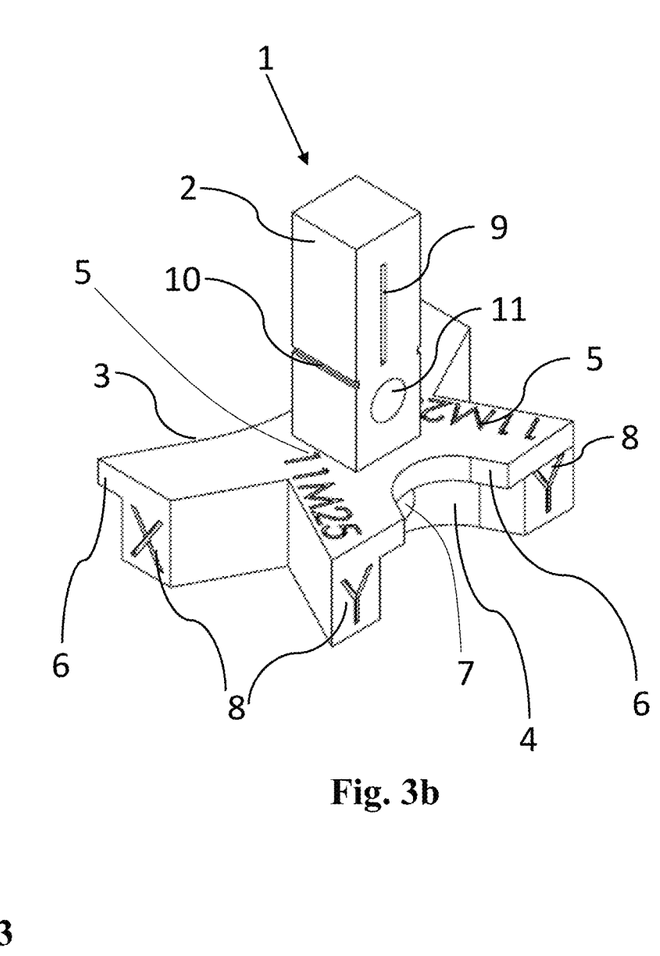
Figure 4:
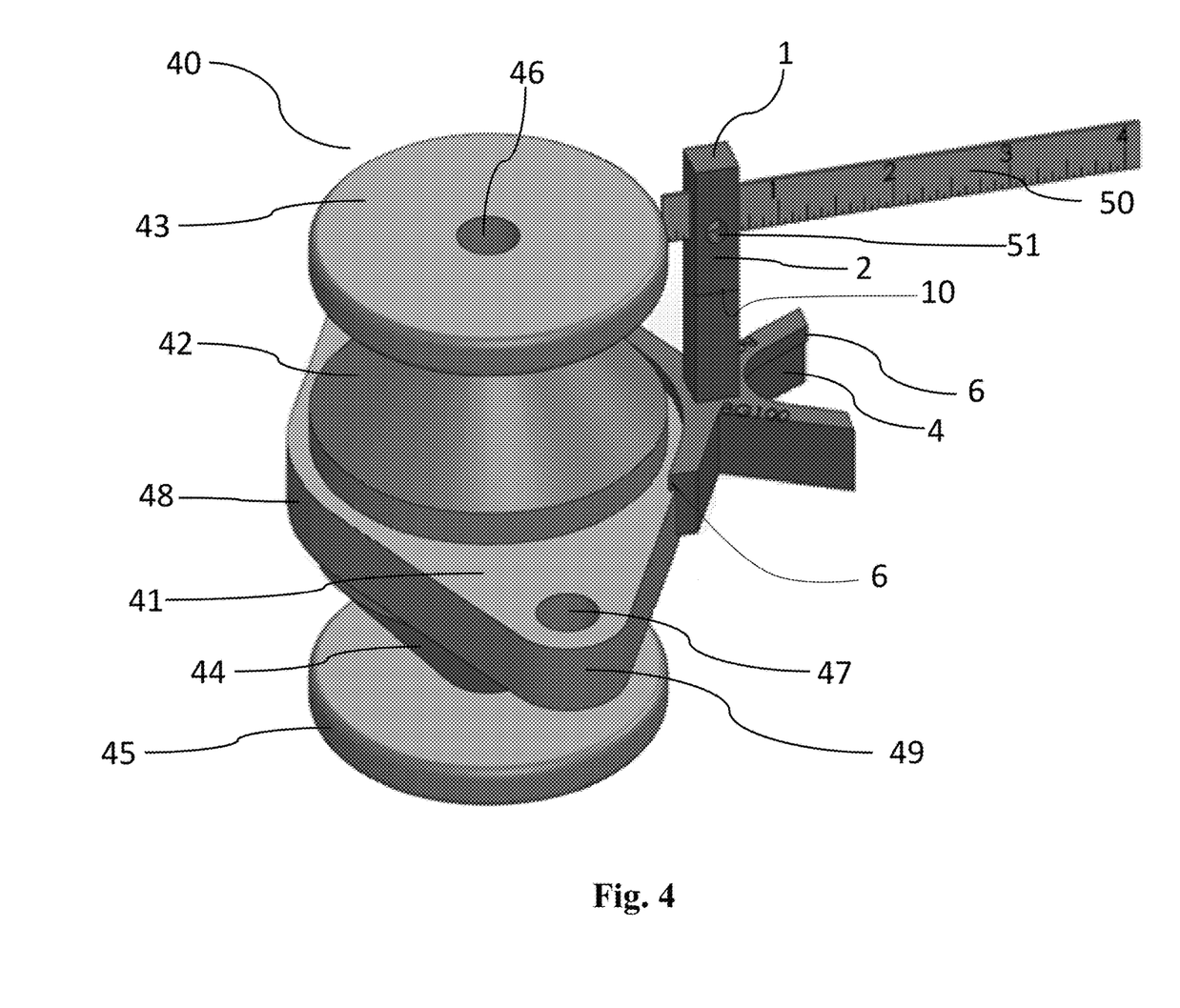
FIG. 4 depicts an embodiment of the invention illustrating the use of a resilient mount gage tool embodiment of the invention as used to measure the alignment and snubber gap in an example resilient mount.
Figure 5:
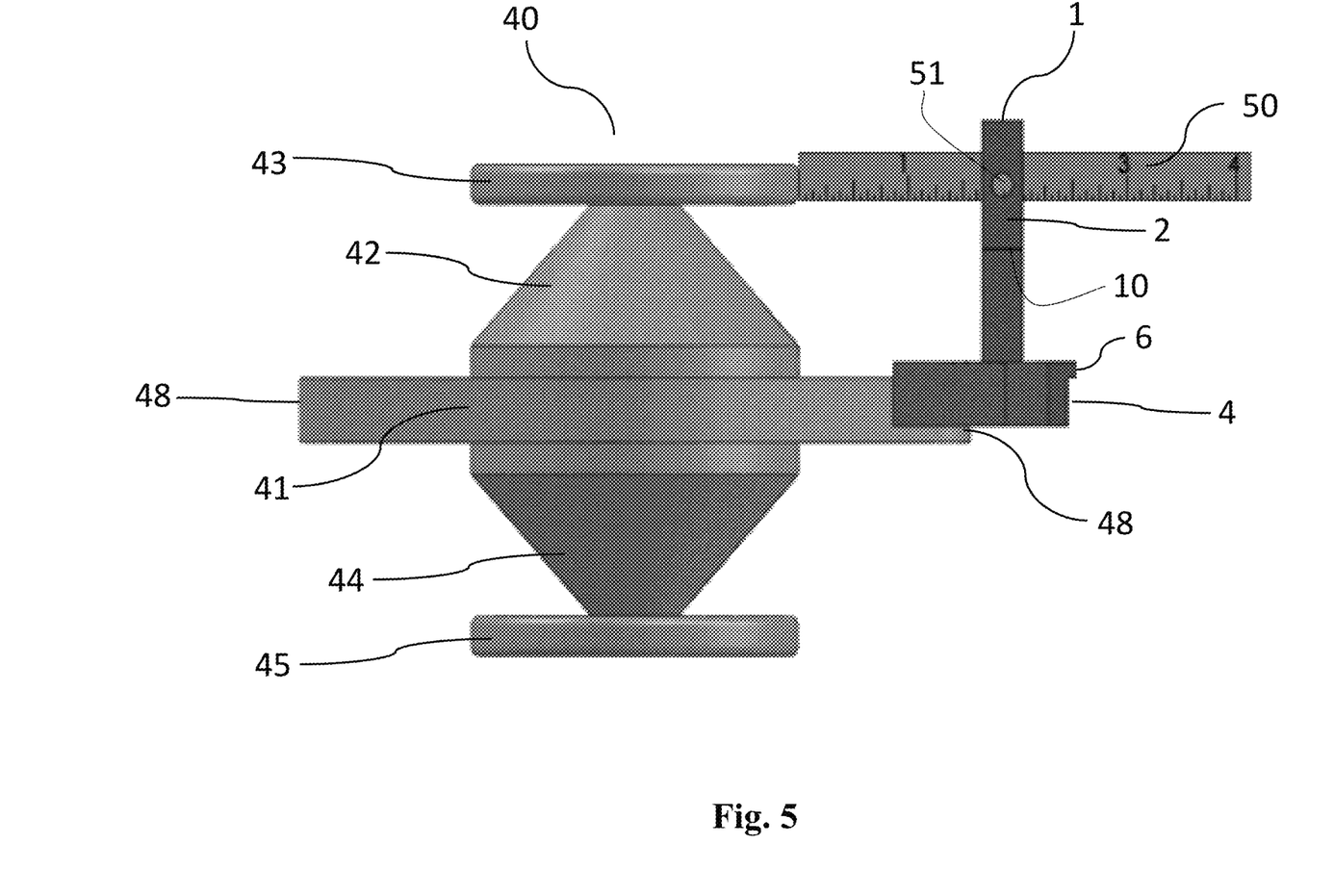
FIG. 5 depicts an embodiment of the invention illustrating the use of a resilient mount gage tool embodiment of the invention as used to measure the alignment and snubber gap in an example resilient mount.
Figure 6:
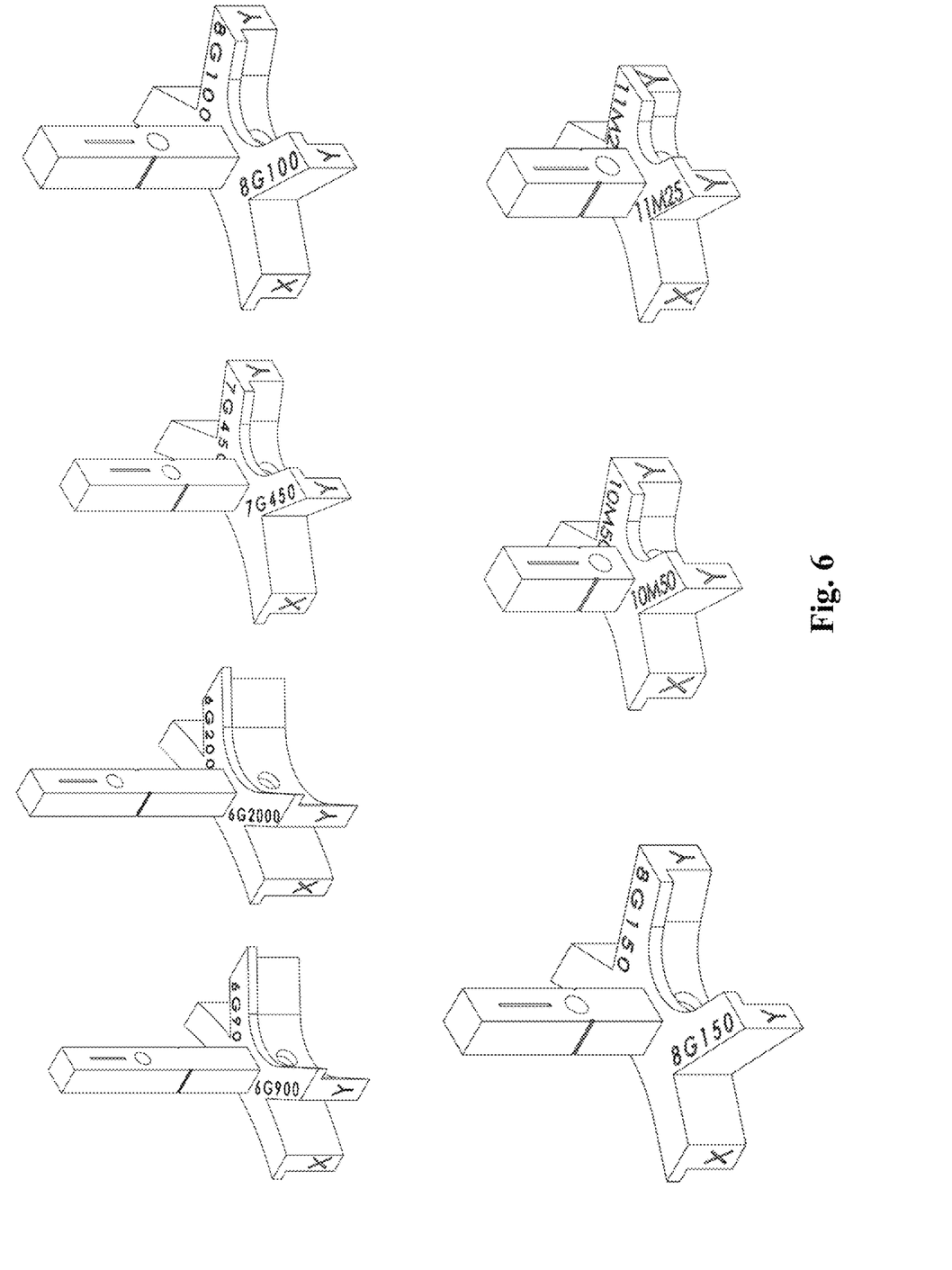
FIG. 6 depicts an embodiment of the invention being a set of resilient mount gage tools designed to fit a variety of resilient mounts.

With reference to the Figures, FIGS. 1 and 2 illustrate a resilient mount gage tool 1 of the invention for use in inspecting G series mounts. FIG. 3 illustrates views of two gage tools 1 of the invention for use in inspecting M series mounts. FIGS. 4 and 5 illustrate use of the invention's gage tools with typical resilient mounts. FIG. 6 illustrates a set of gage tools of the invention.

Precise measurements of the depth and alignment of snubber gaps are desirable for the purposes of comparison between units, long term trending, and maintenance of optimum performance of the resilient mounts. A typical resilient mount (a G-Series or M-series Piping Mount) is illustrated in FIGS. 4 and 5. The resilient mount 40 has a foundation 41, which is generally in the shape of a rhombus with obtuse and acute corners; however, all four corners are smoothly curved to present with convexly curved surfaces. For purposes of orientation, the direction from one curved obtuse corner 48 to the other curved obtuse corner 48 is considered the Y-axis, the curved obtuse corners 48 thus alternatively referred to herein as Y-axis corners 48, while the direction from one curved acute corner 49 to the other curved acute corner 49 is considered the X-axis, the curved acute corners 49 thus alternatively referred to herein as X-axis corners 49.

Centered snubbers 42,44 are located on both the upper and lower surface of the foundation 41. An upper load washer 43 sits above the upper snubber 42, and a lower load washer 45 sits below the lower snubber 44. A central hole 46 running through the entire mount assembly through the mount's central axis allows for use of the resilient mount 40 on structures such as pipes. The foundation 41 has mounting holes 47 located near the X-axis corners 49. The X-axis corners 48 and Y-axis corners 49 (collectively, convex corners 48,49) are convex curves, suitable for being mated to matching concavely curved X-axis and Y-axis ports 3,4 respectively on the gage tool 1 of the invention.

The gage tool 1 has an upright stem 2, at the bottom of which are situated two concavely curved ports, the X-axis port 3 and the Y-axis port 4 (collectively, the concave ports 3,4), which precisely match, respectively, each pair of convexly curved obtuse X-axis corners 48 and acute Y-axis corners 49 of the resilient mount 40. The X-axis port 3 is thus said to be a partner to the X-axis corner 48, while the Y-axis port 4 is said to be a partner to the Y-axis corner 49. The concave ports 3,4 of the gage tool 1 are situated and oriented 180 degrees opposite each other around the vertical axis of the upright stem 2. The gage tool 1 of the invention fits securely to the foundation 41 edges of the mount 40 at each of its convex X-axis and Y-axis corners 48, 49.

The concave ports 3,4 of the gage tool 1 are equipped with flanges 6 at their upper surfaces, such that the concave ports 3,4 may be placed to rest snugly on the foundation's convex corners 48,49. The flanges 6 are constructed such that for each concave port 3,4 a centered line running down the surface of the stem 2 facing the concave port 3,4 is precisely colinear with the a line running down the center of the inner surface of the concave ports 3,4, and thus also collinear with a tangent line running down the center of the convex corners 48,49. This configuration assures that when the gage tool 1 is placed on the resilient mount 40, with one of its concave ports 3 or 4 snugly meeting its partner convex corner 48 or 49 of the resilient mount 40 with the flange 6 securing the gage tool 1 in place, the center of the surface of the stem 2 facing the resilient mount 40 is at precisely the same distance from the central axis of the resilient mount 40 as the furthest edge of the convex corner 48 or 49. Such a geometry enables measurements from the stem 2 to the load washers 43,45 as described further below.

In typical operation, the user first chooses the appropriate gage tool 1 designed for the particular mount model to be inspected. To assist, the gage tool 1 may have identification markings 5 for the particular mount type and model etched, printed, or otherwise presented on the gage tool 1 itself for the convenience of the user in choosing the appropriate gage tool 1 for specific mounts. Such markings 5 may be present on the upright stem 2, the concave ports 3,4, or both. Additionally, the gage tool 1 may be marked with markings for the X- and Y-axes 8. The gage tool 1 may optionally have a hole 11 bored through the stem 2 enabling the user to carry one or more gage tools 1 on a lanyard.

In either order, the X-axis or the Y-axis of the mount 40 may be inspected. The user places one of the concave ports 3 or 4 of the gage tool 1 alongside the mount 40 for a snug fit with its partner convex corner 48 or 49 of the mount. The flange 6 of the gage tool 1 rests on the upper surface of the foundation 41 with the concave ports 3,4 precisely fitting the convex corners 48,49. Depending on the mount 40 to be inspected, a ruler 50 of several inches, up to approximately six inches in length, one half inch high, and approximately 1/32-inch thickness is inserted into the slot 9 in the upright stem 2. The slot 9 is designed to accommodate such a ruler 50 and to hold it securely by friction. An optional thumb screw can be used to secure the ruler 50 in place if needed, such a thumb screw being inserted in an optional threaded thumb screw hole 51 bored in the upright stem 2, but typically the inserted ruler 50 resides securely in the slot 9 for the duration of measurement and can easily be adjusted by sliding in the slot 9. An optional magnet may be placed into an optional recession 7 in the center of the curved ports 3,4 of the gage tool 1 to provide additional assistance keeping the gage tool 1 more firmly secured to the mount foundation 41 convex corners 48,49 for measurements.

Once the gage tool 1 is placed on the mount 40 as described, the user slides the ruler 50 until it contacts either load washer 43,45 and the user then takes a distance measurement by reading the ruler 50 at the edge of the stem 2 nearest and facing the load washer 43,45. Due to the geometry of the gage tool 1, the reading is also a measure of the distance from the outer edge of the convex corner 48,49 to the edge of the load washer 43,45. The entire measurement operation can be performed using only one hand. The user may then make additional measurements at one or more of the other three convex corners 48,49. If the resilient mount 40 is within specification, the measured distances of the pairs of X-axis corners 48 and Y-axis corners 49 will match within pre-specified tolerances. If the measurements from opposing convex corners 48,49 differ to a degree greater than such tolerances, the mount 40 is determined to be outside of alignment specification and should be repaired or replaced.

While a ruler 50 is a simple device for making such measurements, in certain applications it may be desired to use more sophisticated measurement tools. For example, the stem 2 may be equipped with a suitable laser measurement device for measuring the distance between the edge of the stem 2 and the load washer 43,45. In such an embodiment of the invention, the measurement laser could be activated to provide measurements locally on the gage tool 1 itself, or remotely via a wireless connection to another device.

A horizontal go/no-go line 10 may be etched, printed, scored, or otherwise presented in the upright stem 2 on one or more sides thereof to represent the height of a snubber which is within the snubber gap specification for its depth. The go/no-go line 10 is used to mark the position with respect to the mount's 40 minimal allowable snubber height. If the lowermost surface of either load washer 43,45 is below the go/no-go line 10 then the snubber is overcompressed. Such a condition indicates one of several potential problems: (i) the snubber 42,44 may need to be replaced; (ii) the load may need to be evaluated for incorrect loading; (iii) the mount 40 may be damaged and in need of replacement; or (iv) the mount 40 may be undersized for the mass loading and a different mount 40 should be considered for usage in that location.

The resilient mount gage tool 1 of the invention fosters both easier and safer inspection of resilient mounts 40, and also promotes more accurate mount measurements. The gage tool 1 allows the user to make a mount measurement quickly with an only one hand operation. The mount gage tool 1 saves time in making measurements along both X- and Y-axes directions, and the measurements have high accuracy and precision. The user can carry, for example, a complete set of seven G-series and two M-series mount gage tools 1 on a lanyard using the lanyard hole 11 and thereby be prepared to inspect any or all G- and M-series mounts 40 which may be encountered during a typical inspection session on a naval vessel. In particularly tight spaces on vessels, it may be difficult even to read the identification of the mount type on the resilient mount 40. The gage tools 1 of the invention allow the user to identify the actual mount because each gage tool precisely fits a particular mount model and type. Thus, inspecting resilient mounts 40 in tight spaces with difficult lighting is facilitated for the user equipped with the gage tools 1 of the invention. The optional features of magnets placed within recesses 7 and thumb screws placed within thumb screw holes 51 provide additional advantages, enhancing the securing of the gage tool 1 to the mount 40 and enhancing the steadiness of the ruler 50 in place to allow reading the measurements.

Those of skill in the art will readily appreciate that the components of the may be chosen to achieve particularly desired results in particular applications. The gage tool 1 of the invention may be constructed from a wide variety of materials, including any sufficiently rigid materials capable of maintaining structural integrity through repeated use. For example, the tools 1 may be fabricated from metals, such as aluminum, copper, and the like; alloys, such as steel and stainless steel; carbon fiber; resins; composites; acrylics; plastics, thermoplastics, thermoplastic polymers, and biopolymers; and other suitable materials. The gage tools 1 of the invention may be constructed by additive manufacturing (i.e., 3D printing) using such materials as described.

Examples

The following Examples serve to illustrate the present invention and are not intended to limit its scope in any way.

Example 1—A resilient mount gage tool

A gage tool 1 as shown in FIG. 1 designed for inspection of the 8G150 G-series resilient mount was constructed by additive manufacturing from the thermoplastic polymer polylactic acid (PLA). The gage tool's stem 2 was square in cross-sectional profile and measured 0.38 inches on a side. The entire gage tool 1 was 2.3 inches tall. The stem's 2 total length, extending from the upper surface of the concaved curved ports, was 1.73 inches. The concave curved ports 3,4 were 0.57 inches in height, including the flange of 0.13 inches height. The X-axis concave port 3 had a total width from outside edge to outside edge of 2.25 inches. The Y-axis concave port 4 had a total width from outside edge to outside edge of 2.05 inches. The centered magnet recess in both concave curved ports 3,4 had a radius of 0.26 inches, centered in the surface of the unflanged portions of both concave curved ports 3,4. The lanyard hole 11 of 0.20 inches in radius was centered on the surface of the stem 2 facing the Y-axis port 4, and was 0.75 inches up the stem 2. The ruler slot 9 was centered on the stem 2 vertically 0.50 inches in length, 0.03 inches in width, and passing through the stem from the surface facing the Y-axis port 4 through the stem to the surface facing the X-axis port, with its lowest extent being 0.25 inches above the center of the lanyard hole 11. The go/no-go line was scored 0.65 inches up the stem 2. Marking were placed for identification of the mount model 8G150 5, the X-axis port 8, and Y-axis port 8. The gage tool 1 as constructed was used to inspect a sample 8G150 G-series resilient mount 40, and to determine whether the mount 40 was within specification.

Example 2—A resilient mount gage tool

A gage tool 1 as shown in FIG. 1 designed for inspection of the 8G100 G-series resilient mount was constructed by additive manufacturing from the thermoplastic polymer polylactic acid (PLA). The gage tool's stem 2 was square in cross-sectional profile and measured 0.38 inches on a side. The entire gage tool 1 was 2.38 inches tall. The stem's 2 total length, extending from the upper surface of the concaved curved ports, was 1.87 inches. The concave curved ports 3,4 were 0.51 inches in height, including the flange of 0.13 inches height. The X-axis concave port 3 had a total width from outside edge to outside edge of 2.25 inches. The Y-axis concave port 4 had a total width from outside edge to outside edge of 1.94 inches. The centered magnet recess in both concave curved ports 3,4 had a diameter of 0.26 inches, centered in the surface of the unflanged portions of both concave curved ports 3,4. The lanyard hole 11 of 0.20 inches in diameter was centered on the surface of the stem 2 facing the Y-axis port 4, and was 0.62 inches up the stem 2. The ruler slot 9 was centered on the stem 2 vertically 0.50 inches in length, 0.03 inches in width, and passing through the stem from the surface facing the Y-axis port 4 through the stem to the surface facing the X-axis port, with its lowest extent being 0.25 inches above the center of the lanyard hole 11. The go/no-go line was scored 0.88 inches up the stem 2. Marking were placed for identification of the mount model 8G100 5, the X-axis port 8, and Y-axis port 8. The gage tool 1 as constructed was used to inspect a sample 8G100 G-series resilient mount 40, and to determine whether the mount 40 was within specification.

Example 3—A resilient mount gage tool

A gage tool 1 as shown in FIG. 1 designed for inspection of the 10M50 M-series resilient mount was constructed by additive manufacturing from the thermoplastic polymer polylactic acid (PLA). The gage tool's stem 2 was square in cross-sectional profile and measured 0.38 inches on a side. The entire gage tool 1 was 1.69 inches tall. The stem's 2 total length, extending from the upper surface of the concaved curved ports, was 1.12 inches. The concave curved ports 3,4 were 0.57 inches in height, including the flange of 0.13 inches height. The X-axis concave port 3 had a total width from outside edge to outside edge of 1.75 inches. The Y-axis concave port 4 had a total width from outside edge to outside edge of 1.50 inches. The centered magnet recess in both concave curved ports 3,4 had a diameter of 0.26 inches, centered in the surface of the unflanged portions of both concave curved ports 3,4. The lanyard hole 11 of 0.20 inches in diameter was centered on the surface of the stem 2 facing the Y-axis port 4, and was 0.37 inches up the stem 2. The ruler slot 9 was centered on the stem 2 vertically 0.50 inches in length, 0.03 inches in width, and passing through the stem from the surface facing the Y-axis port 4 through the stem to the surface facing the X-axis port, with its lowest extent being 0.22 inches above the center of the lanyard hole 11. The go/no-go line was scored 0.35 inches up the stem 2. Marking were placed for identification of the mount model 10M50 5, the X-axis port 8, and Y-axis port 8. The gage tool 1 as constructed was used to inspect a sample 10M150 M-series resilient mount 40, and to determine whether the mount 40 was within specification.

Example 4—A set of resilient mount gage tools

A set of seven gage tools 1 was constructed including those described in Examples 1-3, as well as those designed for additional resilient mounts. The set of gage tools 1 includes seven designed for five different G-series mounts, and two designed for two M-series mounts. The set of gage tools 1 is illustrated in FIG. 6.

The present invention is not to be limited in scope by the specific embodiments described above, which are intended as illustrations of aspects of the invention. Functionally equivalent methods and components are within the scope of the invention. Various modifications of the invention, in addition to those shown and described herein, will be readily apparent to those skilled in the art from the foregoing description. Such modifications are intended to fall within the scope of the appended claims. All cited documents are incorporated herein by reference.

What is claimed is:

1. A gage tool for measuring an alignment and a snubber gap height of a resilient mount having a foundation with a pair of convex curved obtuse X-axis corners and a pair of convex curved acute Y-axis corners, two snubbers, and two load washers, the gage tool comprising:
    a stem with a top and a bottom;
    a concave X-axis port situated at the bottom of the stem, having an X-axis flange coextensive with the X-axis port's upper surface, the X-axis port snugly fitting the X-axis corners of the foundation;
    a concave Y-axis port situated at the bottom of the stem, having a Y-axis flange coextensive with the Y-axis port's upper surface, the Y-axis port snugly fitting the Y-axis corners of the foundation;
    a go/no-go line for measuring the sufficiency of the snubber gap height; and
    a ruler slot extending through the stem for accepting a ruler;
    wherein, upon positioning the gage tool on a plurality of the curved convex corners of the resilient mount, a plurality of measurements of the distance from the stem to the load washer are taken to determine whether the resilient mount is aligned within an alignment specification, and the snubber gap height is measured with respect to the go/no-go line to determine whether the snubber gap height is within a snubber gap specification.

2. The gage tool of claim 1, further comprising markings identifying a type and a model of the resilient mount for which the gage tool is designed to fit.

3. The gage tool of claim 1, further comprising markings identifying the X-axis and the Y-axis.

4. The gage tool of claim 1, wherein the stem has a cross section selected from the group consisting of square, rectangular, circular, and elliptical.

5. The gage tool of claim 1, further comprising a first magnet embedded in a first recess in the X-axis port and a second magnet embedded in a second recess in the Y-axis port.

6. A tool set comprising a plurality of gage tools of claim 1, wherein each of the plurality of gage tools is designed to fit a different model of resilient mount.

7. A method of measuring the alignment and the snubber gap height of the resilient mount having the foundation with the pair of convex curved obtuse X-axis corners and the pair of convex curved acute Y-axis corners, two snubbers, and two load washers, the method comprising the steps of:
    (a) placing the gage tool of claim 1 snugly against the convex curved corners of the foundation with the flanges resting on the foundations surface;
    (b) measuring with the ruler inserted through the slot a distance between the stem and the load washer;

(c) repeating steps (a) and (b) at one or more additional convex corners;
(d) determining from the measured distances whether the alignment of the resilient mount is within an alignment specification; and
(e) during steps (a) through (c), measuring the snubber gap height with respect to the go/no-go line, and determining whether the snubber gap height is within the snubber gap height specification.

8. The gage tool of claim 1, wherein the gage tool is constructed from a material selected from the group consisting of metals, metal alloys, carbon fiber, resins, composites, acrylics, plastics, thermoplastics, thermoplastic polymers, and biopolymers.

9. The gage tool of claim 8, wherein the gage tool is constructed by additive manufacturing.

10. The gage tool of claim 8, wherein the gage tool is constructed from stainless steel.

11. The gage tool of claim 8, wherein the gage tool is constructed from aluminum.

12. The gage tool of claim 1, further comprising a lanyard hole.

13. A tool set comprising a plurality of gage tools of claim 12, wherein each of the plurality of gage tools is designed to fit a different model of resilient mount.

14. The tool set of claim 13, wherein the plurality of gage tools are all carried on a lanyard passed through the lanyard hole of each gage tool.

* * * * *